US011900972B2

(12) United States Patent
Ee et al.

(10) Patent No.: US 11,900,972 B2
(45) Date of Patent: Feb. 13, 2024

(54) NON-OPERATIONAL SHOCK MITIGATION FOR A SUSPENSION DEVICE

(71) Applicant: Magnecomp Corporation, Murrieta, CA (US)

(72) Inventors: Kuen Chee Ee, Chino, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/342,297

(22) Filed: Jun. 8, 2021

(65) Prior Publication Data

US 2021/0390979 A1 Dec. 16, 2021

Related U.S. Application Data

(60) Provisional application No. 63/037,524, filed on Jun. 10, 2020.

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
CPC ............................ G11B 5/4833; G11B 5/4826
See application file for complete search history.

(56) References Cited

U.S. PATENT DOCUMENTS

| 5,282,103 | A  |   | 1/1994  | Hatch et al. |            |
|-----------|----|---|---------|--------------|------------|
| 5,333,085 | A  | * | 7/1994  | Prentice     | G11B 5/4826 |
| 5,530,606 | A  | * | 6/1996  | Baasch       | G11B 5/4826 |
|           |    |   |         |              | 360/245.6 |
| 5,771,136 | A  | * | 6/1998  | Girard       | G11B 5/4833 |
|           |    |   |         |              | 360/245.7 |
| 5,892,637 | A  | * | 4/1999  | Brooks, Jr.  | G11B 5/4853 |
|           |    |   |         |              | 360/234.5 |
| 6,163,438 | A  | * | 12/2000 | Kajitani     | G11B 5/6005 |
|           |    |   |         |              | 360/245.7 |
| 6,172,853 | B1 | * | 1/2001  | Davis        | G11B 5/488 |
| 6,233,121 | B1 | * | 5/2001  | Pan          | G11B 5/4826 |
|           |    |   |         |              | 360/245.7 |
| 6,320,729 | B1 | * | 11/2001 | Coon         | G11B 5/4826 |
| 6,424,498 | B1 | * | 7/2002  | Patterson    | G11B 5/4826 |
| 6,483,670 | B1 | * | 11/2002 | Watanabe     | G11B 5/4826 |
|           |    |   |         |              | 360/245.7 |

(Continued)

OTHER PUBLICATIONS

International Search Report and Written Opinion in International Application No. PCT/US2021/036642, dated Sep. 22, 2021.

(Continued)

*Primary Examiner* — Brian E Miller
(74) *Attorney, Agent, or Firm* — DLA Piper LLP (US)

(57) ABSTRACT

A flexure is described herein. The flexure includes a slider tongue with a proximal end and a distal end. The sliding tongue including a leading edge at the proximal end prone to contact an undersurface of a load beam attached to the flexure. The flexure also includes a magnetic read/write head slider attached to the slider tongue at the distal end, at least one PZT microactuator affixed to the slider tongue, between the proximal end and the distal end, and at least one dampening device at the leading edge of the slider tongue configured to reduce an impulse during a non-operational shock event and reduce stress on the at least one PZT microactuator.

10 Claims, 8 Drawing Sheets

(56) References Cited

U.S. PATENT DOCUMENTS

| | | | |
|---|---|---|---|
| 6,538,850 B1 * | 3/2003 | Hadian | G11B 5/4853 360/245.7 |
| 6,556,383 B2 | 4/2003 | Murphy et al. | |
| 6,611,402 B1 * | 8/2003 | Mangold | G11B 5/4826 360/255 |
| 6,747,849 B1 * | 6/2004 | Le | G11B 5/484 |
| 6,757,137 B1 * | 6/2004 | Mei | G11B 5/4826 360/245.7 |
| 6,801,400 B2 * | 10/2004 | Fu | G11B 5/4826 |
| 6,885,523 B1 * | 4/2005 | Summers | G11B 5/4846 360/244.3 |
| 6,967,821 B2 * | 11/2005 | Himes | G11B 5/4826 360/245.3 |
| 6,995,953 B2 * | 2/2006 | Mahoney | G11B 5/4826 |
| 7,006,333 B1 * | 2/2006 | Summers | G11B 5/4826 360/245.7 |
| 7,010,847 B1 * | 3/2006 | Hadian | G11B 5/4853 29/603.03 |
| 7,085,104 B1 * | 8/2006 | Hadian | G11B 5/40 360/245.7 |
| 7,307,817 B1 * | 12/2007 | Mei | G11B 5/4826 360/245.7 |
| 7,551,401 B1 * | 6/2009 | Ciurea | G11B 5/4826 360/245.7 |
| 7,719,797 B1 * | 5/2010 | Mei | G11B 5/6005 360/245.7 |
| 7,751,149 B1 * | 7/2010 | Mei | G11B 5/6005 360/245.7 |
| 7,852,604 B2 * | 12/2010 | Sassine | H05K 1/118 360/245.3 |
| 8,107,198 B1 * | 1/2012 | Ee | G11B 5/4826 360/245.7 |
| 8,446,695 B1 * | 5/2013 | Ee | G11B 5/4826 360/245.3 |
| 9,025,282 B1 * | 5/2015 | Miller | H05K 3/0061 360/245.3 |
| 9,214,176 B1 * | 12/2015 | Sharma | G11B 5/483 |
| 10,276,195 B2 | 4/2019 | Ee et al. | |
| 11,410,693 B2 | 8/2022 | Ee et al. | |
| 2001/0012182 A1 * | 8/2001 | Boutaghou | G11B 5/4853 360/245.7 |
| 2003/0137774 A1 * | 7/2003 | Fu | G11B 5/4826 360/245.7 |
| 2003/0202284 A1 * | 10/2003 | Arya | G11B 5/4833 360/244.3 |
| 2004/0070883 A1 * | 4/2004 | Mahoney | G11B 5/4833 |
| 2005/0180052 A1 * | 8/2005 | Suzuki | G11B 5/4826 |
| 2006/0034017 A1 * | 2/2006 | Agari | G11B 5/486 360/245.7 |
| 2006/0092571 A1 * | 5/2006 | Kang | G11B 5/4833 |
| 2006/0209466 A1 * | 9/2006 | Ono | G11B 5/4833 360/245.7 |
| 2006/0274452 A1 * | 12/2006 | Arya | G11B 5/4806 360/245.3 |
| 2006/0274453 A1 * | 12/2006 | Arya | G11B 5/4833 360/245.3 |
| 2009/0244786 A1 * | 10/2009 | Hatch | G11B 5/483 360/294.4 |
| 2010/0315744 A1 * | 12/2010 | Virmani | G11B 5/4826 360/245.3 |
| 2014/0085754 A1 | 3/2014 | Hanya et al. | |
| 2014/0362476 A1 * | 12/2014 | Miller | G11B 5/4833 360/245.7 |
| 2021/0151073 A1 * | 5/2021 | Yamada | G11B 5/4833 |
| 2021/0280209 A1 * | 9/2021 | Suzuki | G11B 5/4846 |

OTHER PUBLICATIONS

International Preliminary Report on Patentability in International Application No. PCT/US2021/036642, dated Dec. 22, 2022.

* cited by examiner

NON-OPERATIONAL SHOCK MITIGATION FOR A SUSPENSION DEVICE

CROSS-REFERENCE TO RELATED APPLICATIONS

This application claims the benefit of U.S. Provisional Application No. 63/037,524 filed on Jun. 10, 2020, which is hereby incorporated by reference in its entirety.

FIELD

This disclosure relates to the field of suspensions for hard disk drives. More particularly, this disclosure relates to the field of suspension devices including dampening features to mitigate non-operational shock damage.

DESCRIPTION OF RELATED ART

Magnetic hard disk drives and other types of spinning media drives such as optical disk drives are well known. A typical disk drive unit includes a spinning magnetic disk containing a pattern of magnetic storage medium ones and zeroes on it that constitutes the data stored on the disk drive. The magnetic disk is driven by a drive motor. The disk drive unit further includes a disk drive suspension to which a magnetic read/write is mounted proximate a distal end of load beam. The "proximal" end of a suspension or load beam is the end that is supported, i.e., the end nearest to the baseplate which is swaged or otherwise mounted to an actuator arm. The "distal" end of a suspension or load beam is the end that is opposite the proximal end, i.e., the "distal" end is the cantilevered end.

The suspension is coupled to an actuator arm, which in turn is coupled to a voice coil motor that moves the suspension arcuately in order to position the head slider over the correct data track on the data disk. The head slider is carried on a gimbal which allows the slider to pitch and roll so that it follows the proper data track on the disk, allowing for such variations as vibrations of the disk, inertial events such as bumping, and irregularities in the disk's surface.

SUMMARY

A flexure is described herein. The flexure includes a slider tongue with a proximal end and a distal end. The sliding tongue including a leading edge at the proximal end prone to contact an undersurface of a load beam attached to the flexure. The flexure also includes a magnetic read/write head slider attached to the slider tongue at the distal end, at least one actuator affixed to the slider tongue, between the proximal end and the distal end, and at least one dampening device at the leading edge of the slider tongue configured to reduce an impulse during a non-operational shock event and reduce stress on the at least one actuator.

In some examples of the flexure, the at least one dampening device includes multiple dampening devices, one positioned at each corner of the leading edge, and at least one dampening device positioned between the corners. In some examples of the flexure, the at least one dampening device is made up of base metal material extending from the surface of the slider tongue. In some examples of the flexure, the at least one dampening device includes viscoelastic material attached to the slider tongue. In some examples of the flexure, the at least one dampening device is curved at an end that contacts the load beam.

An alternative flexure is described herein. The alternative flexure includes a slider tongue with a proximal end and a distal end. The sliding tongue including a leading edge at the proximal end prone to contact an undersurface of a load beam attached to the flexure. The alternative flexure includes a magnetic read/write head slider attached to the slider tongue at the distal end, at least one actuator affixed to the slider tongue, between the proximal end and the distal end, and at least one partial etched portion at the leading edge of the slider tongue configured to reduce an impulse during a non-operational shock event and reduce stress on the at least one actuator.

In some examples of the alternative flexure the at least one partial etched portion includes multiple partial etched portions, one positioned at each corner of the leading edge. The at least one partial etched portion includes at least one dampening device positioned between the corners.

A load beam is described herein. The load beam includes a mounting surface configured to receive a flexure, and one or more damping material positioned at a location of where a slider tongue of the flexure contacts the mounting surface of the load beam during a non-operational shock event.

In some examples of the load beam the damping material is configured to soften the impact of a leading edge of the slider tongue. The damping material is made up of viscoelastic material. In some examples of the load beam, the damping material is configured to enable a damping effect and absorb the impact energy of the slider tongue during the non-operational shock event. In some examples, the load beam also includes one or more partially etched area, each of the one or more partially etched areas located at the one or more damping material.

A suspension is described herein. The suspension includes a flexure and a load beam. The flexure includes a slider tongue with a proximal end and a distal end. The sliding tongue including a leading edge at the proximal end prone to contact an undersurface of a load beam attached to the flexure. The flexure also includes a magnetic read/write head slider attached to the slider tongue at the distal end, at least one actuator affixed to the slider tongue, between the proximal end and the distal end, and at least one dampening device at the leading edge of the slider tongue configured to reduce an impulse during a non-operational shock event and reduce stress on the at least one actuator. The load beam includes a mounting surface configured to receive the flexure, and one or more damping material positioned at a location of where the slider tongue of the flexure contacts the mounting surface of the load beam during a non-operational shock event.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

Figure 1:
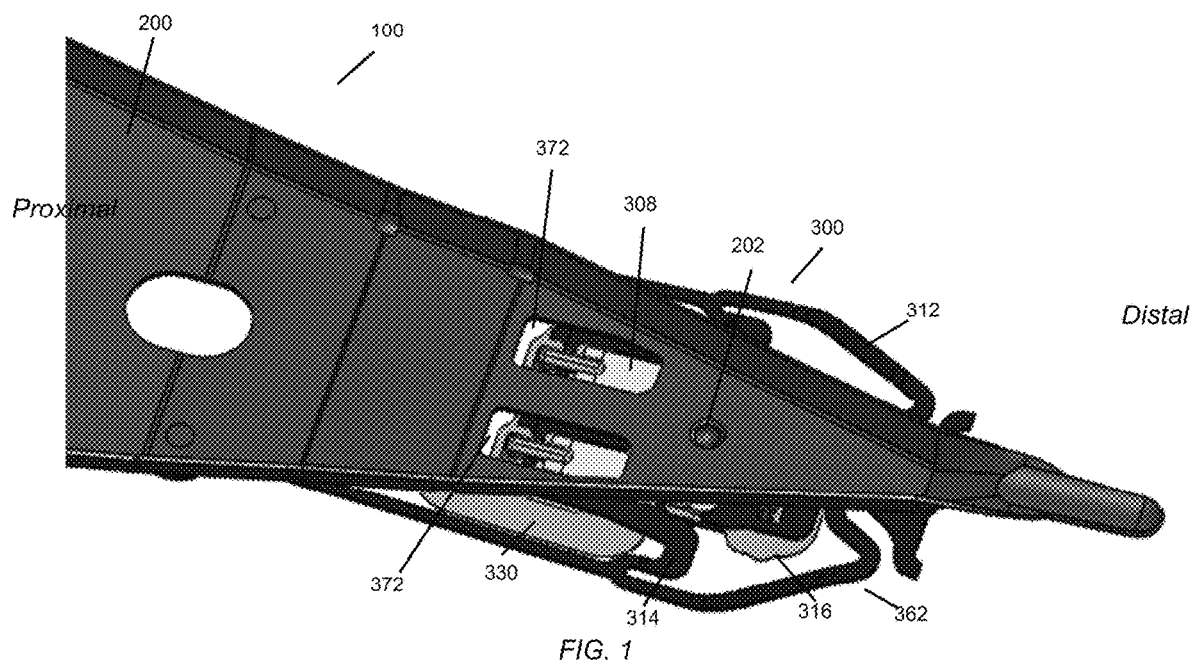
FIG. 1 is a top isometric view of a suspension, in accordance with an example of the disclosure.

FIG. 1 is a top isometric view of a suspension 100, in accordance with an example of the disclosure. The suspension 100 includes a load beam 200 and a flexure 300 welded or otherwise affixed to the load beam 200. The flexure 300 includes a distal gimbal structure 362. The flexure is mounted to a base plate near the proximal end of the suspension 100. Not all the components shown in FIG. 1 may be required to practice the example innovations disclosed herein and variations in the arrangement and type of the components may be made without departing from the spirit or scope of the subject disclosure. Moreover, the suspension 100 may include many more or less components than shown in FIG. 1; however, those shown are sufficient to disclose illustrative examples for practicing the subject innovations.

The distal gimbal structure 362 includes a slider tongue 316 to which a magnetic read/write head slider is attached. This is illustrated in FIGS. 2-7. The flexure 300 can also include a flexible electrical circuit or conductive traces 330. The conductive traces 330 can extend from a proximal end of the flexure to the distal end of the flexure. The distal gimbal structure 362 including slider tongue 316 is configured to pitch and roll freely in response to surface irregularities in a data disk as the disk spins underneath the head slider. The slider is supported for rotational movement in 3 degrees (pitch, roll, and yaw) by a dimple in load beam 200, at a dimple location 202. In the illustrative example shown, the distal gimbal structure 362 includes outer gimbal struts, or simply outer struts, 312. The flexure 300 also includes bridge struts 314, which extend from the outer gimbal struts 312.

At least one actuator 308, such as a PZT microactuator, is affixed to the flexure 300, such that the actuator 308 spans a gap between a leading edge of a slider tongue 316 and a distal end of the slider tongue 316. The positive and negative electrical connections can be made from the at least one actuator 308 to the conductive traces 330. When actuator 308 is activated, it expands or contracts and thus changes the length of the gap thereby producing fine movements of the read/write head that is mounted at the distal end of the slider tongue 316.

Figure 2:
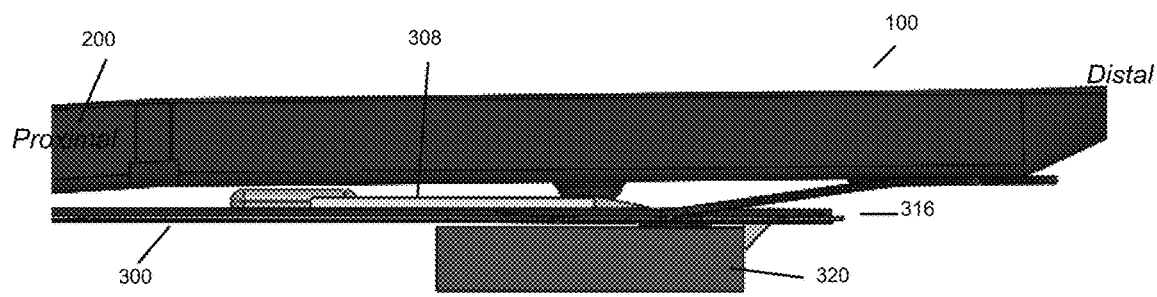
FIG. 2 is side profile of the suspension of FIG. 1, in accordance with an example of the disclosure.

FIG. 2 is a side profile of the suspension 100, in accordance with an example of the disclosure. The flexure 300 includes a head slider 320 fixed or attached to the slider tongue 316. The head slider 320 is carried on a gimbal which allows the head slider 320 to pitch and roll so that it follows the proper data track on a data disk, allowing for such variations as vibrations of the disk, inertial events such as bumping, and irregularities in the disk's surface.

The data disk is susceptible to experiencing a g-force shock when the drive is not being operated. Specifically, the two corners of the slider tongue 316 that are located on the leading edge 372 can contact an undersurface of the load beam 200. The leading edge 372 of the slider tongue 316 is the proximal edge of the slider tongue 316, that is, the edge that is closer to the actuator arm to which the suspension 100 is mounted.

One failure that can occur because of one or more portions of the flexure 300 coming in contact with the load beam 200 is that the actuator experiences enough force such that it cracks and/or breaks, causing a complete failure of an actuator and thus a partial or complete failure of the disk drive. The amount of shock necessary to create this damage and concomitant failure is of a level that disk drives are generally designed to sustain only during non-operation rather than during operation. Such shock events will therefore generally be referred to herein as non-operational or non-op shock events.

Figure 3:
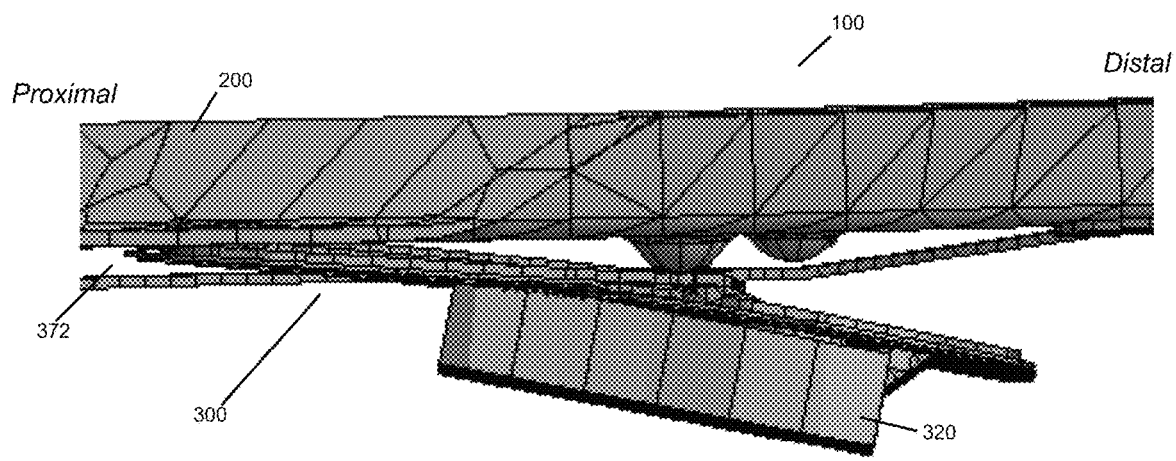
FIG. 3 is side profile of the suspension of FIG. 1 illustrating a leading edge of a slider tongue contacting the load beam, in accordance with an example of the disclosure.
Figure 6:
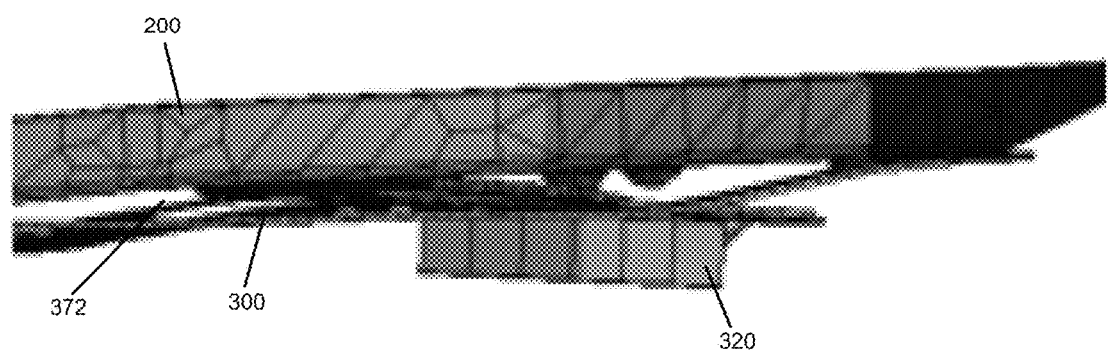
FIG. 6 is side profile of the suspension of FIG. 1 illustrating a leading edge of the tongue contacting the load beam, in accordance with an example of the disclosure.
Figure 7:
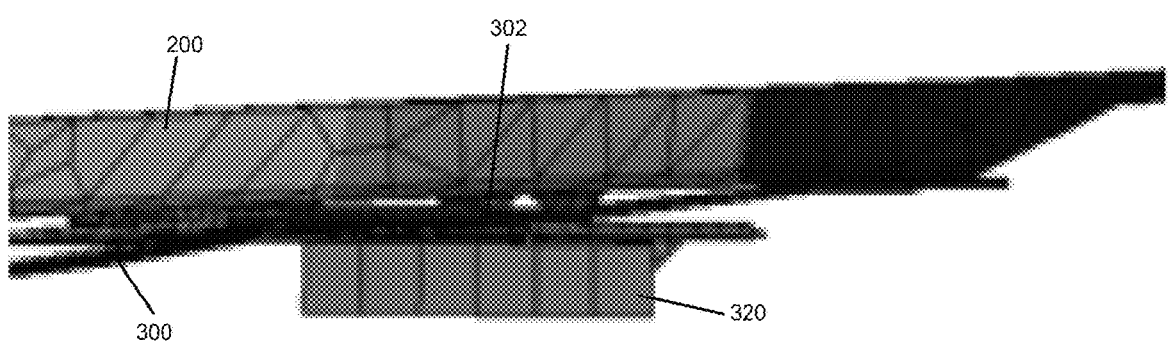
FIG. 7 is side profile of the suspension of FIG. 1 illustrating a slider dimple of the slider tongue contacting the load beam, in accordance with an example of the disclosure.
Figure 8:
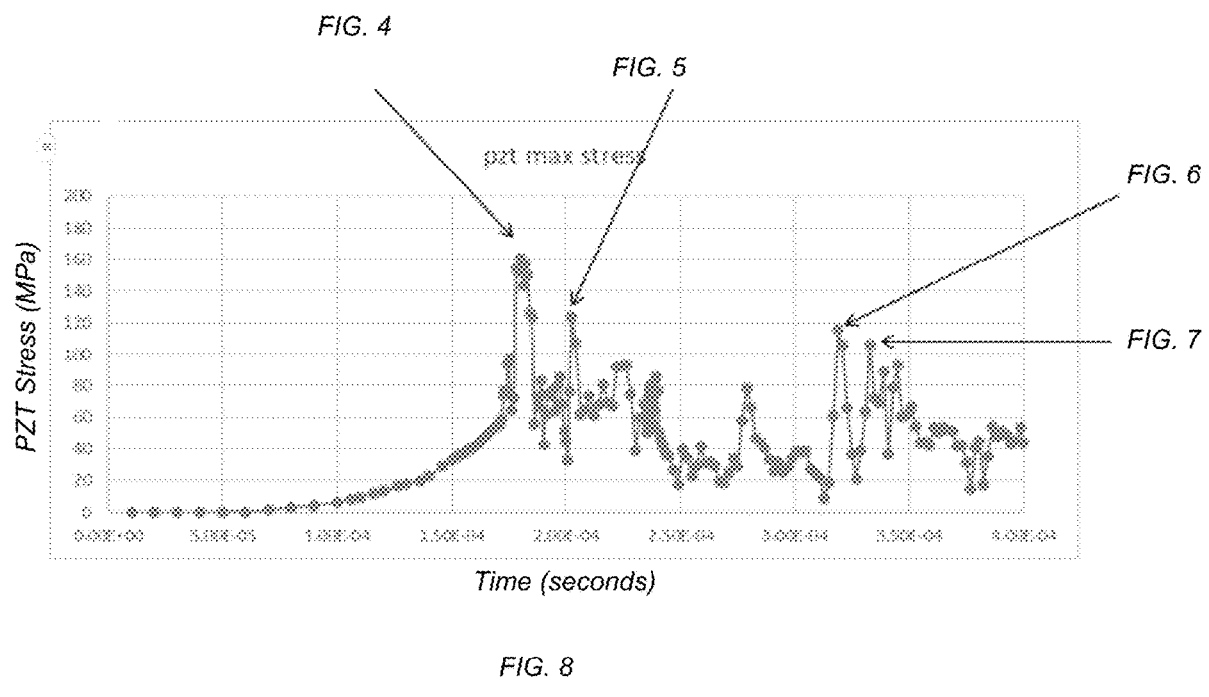
FIG. 8 is a graph that illustrates the stress on the PZT microactuator at the interval time events of FIGS. 4-7, according to a simulation.

FIG. 3 illustrates a leading edge 372 contacting the load beam 200 during a non-op shock event. FIGS. 4-7 other examples of interval time events of the stress applied to one or more actuators disposed on the flexure during a non-op shock event. FIG. 8 is a graph of the stress on an actuator at the interval time events of FIGS. 4-7. During a non-op shock event, the tongue of the flexure can have extreme movement in the pitch direction, and the leading edge of tongue may have sudden contact or impact with the load beam, resulting in high stress on one or more of the actuators.

Figure 4:
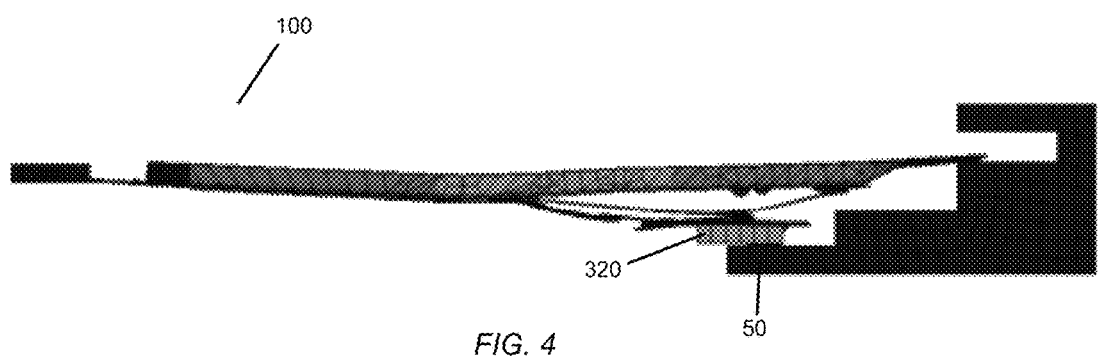
FIG. 4 is side profile of the suspension of FIG. 1 illustrating a head slider contacting a disk drive component (spinning magnetic disk), in accordance with an example of the disclosure.
Figure 5:
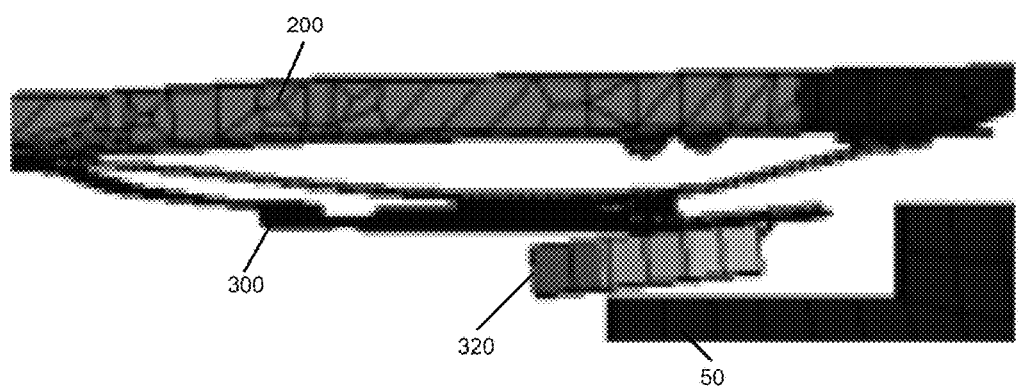
FIG. 5 is side profile of the suspension of FIG. 1 illustrating deformation of the gimbal assembly due to head slider pitching in a negative direction, in accordance with an example of the disclosure.

FIG. 4 illustrates the head slider 320 contacting a disk drive component 50. For example, the disk drive component can include a ramp. The maximum stress to the PZT occurs at the initial contact of the head slider 320 to the disk drive component 50. FIG. 5 illustrates a deformation of the gimbal assembly due to head slider 320 pitching in a negative direction toward the disk drive component 50. Any actuator disposed on the gimbal assembly undergoes stress as a result. FIG. 6 illustrates a leading edge 372 of the tongue contacting the load beam 200, in accordance with an example of the disclosure. Any actuator disposed on the gimbal assembly undergoes stress due to this contact between the leading edge 372 and the load beam 200. FIG. 7 illustrates a slider dimple 302 of the slider tongue contacting the load beam 200. Any actuator disposed on the gimbal assembly undergoes stress due to this contact between the slider dimple 302 and the load beam 200.

The present disclosure proposes eliminating such failure mechanisms by dampening the contact between the leading edge of the slider tongue and the load beam. Multiple example innovations are disclosed herein. The proposed structures reduce the force at which the leading edge of the slider tongue strikes the load beam during a shock event, and especially during a non-op shock event.

Figure 9:
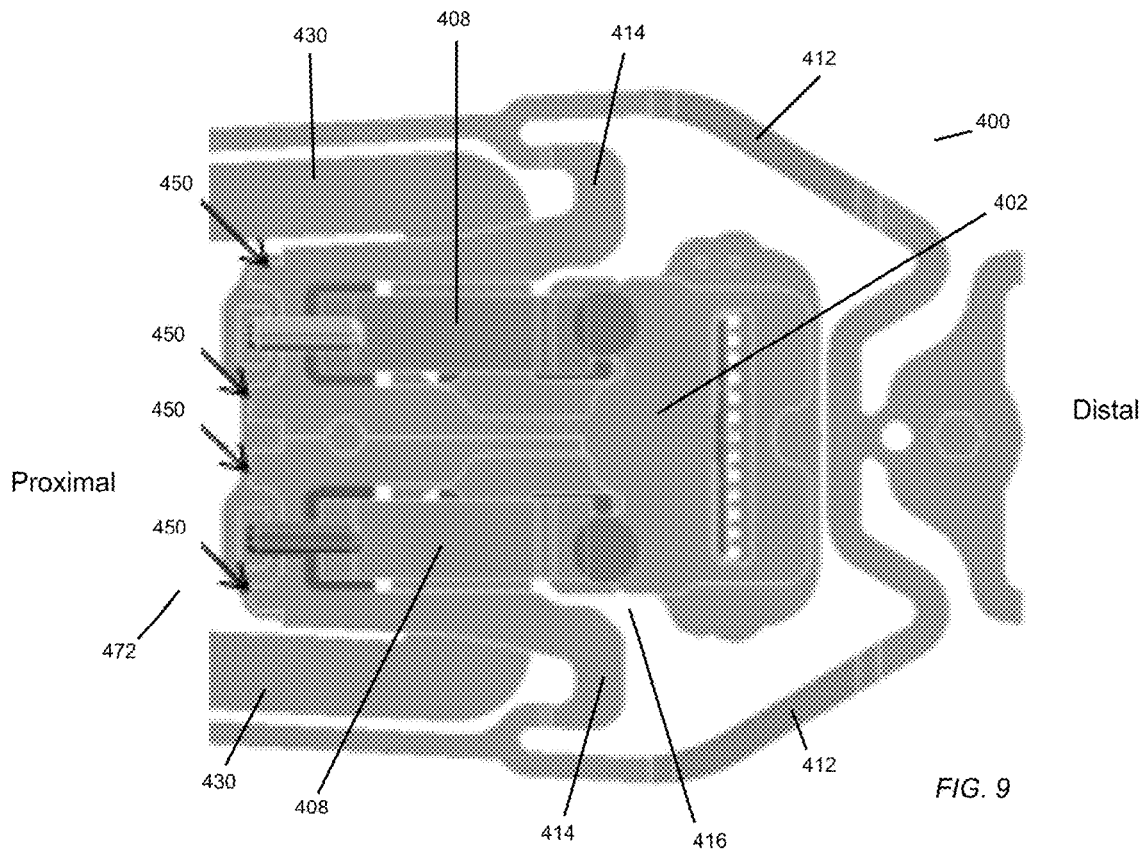
FIG. 9 is a top view of a gimbal assembly of a flexure, in accordance with an example of the disclosure.

FIG. 9 is a top view of a gimbal assembly 400 of a flexure, in accordance with an example of the disclosure. The gimbal assembly 400 includes a slider tongue 416. The slider tongue 416 has an elongated shape with a proximal end and a distal end. A magnetic read/write head slider can be attached to the slider tongue 416 at the distal end. A proximal end of the slider tongue 416 is referred to herein as the leading edge 472. The slider's leading edge 472 can contact an undersurface of the load beam, as described above. At least one actuator 408 can be affixed to the slider tongue 416, between the proximal end and the distal end. The actuator is configured to span respective gaps in the slider tongue 416 between the proximal end and the distal end of the slider tongue 416. The positive and negative or ground electrical connections can be made from the actuators 408 to the conductive traces 430. When actuator 408 is activated, it expands or contracts and thus changes the length of the gap thereby producing fine movements of the read/write head that is mounted at the distal end of the slider tongue 416.

The conductive traces 430 can extend from a proximal end to the distal end of the gimbal assembly 400. The gimbal assembly 400 is configured to enable the slider tongue 416 to pitch and roll freely in response to surface irregularities in a data disk as the disk spins underneath the head slider. The gimbal assembly 400 includes outer gimbal struts 412, or simply outer struts. The gimbal assembly 400 also includes bridge struts 414, which extend from the outer gimbal struts 412 to enable support to a portion of the conductive traces 430.

The leading edge 472 of the slider tongue 416 can include at least one dampening device 450. The leading edge 472 includes multiple dampening devices 450, one positioned at each corner of the leading edge 472, and at least one dampening device 450 positioned between the corners. The dampening device 450 can be made up from the base metal material extending from the surface of the slider tongue 416. Alternatively, the dampening device 450 can include viscoelastic material, or any other known dampening materials, affixed or attached to the slider tongue 416. The dampening device 450 is configured to reduce the impulse during a non-op shock event (e.g., that shown at FIG. 6) and thus lower the stress on an actuator 408.

Not all the components shown in FIG. 9 may be required to practice the example innovations disclosed herein and variations in the arrangement and type of the components may be made without departing from the spirit or scope of the subject disclosure. Moreover, the suspension 100 may include many more or less components than shown in FIG. 9; however, those shown are sufficient to disclose illustrative examples for practicing the subject innovations.

Figure 10:
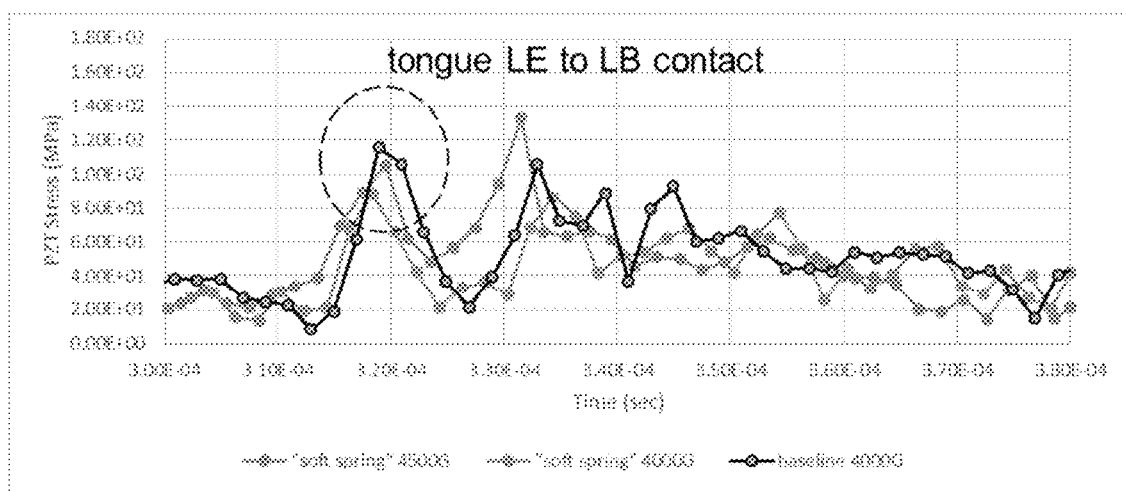
FIG. 10 is a graph that illustrates the stress on a PZT microactuator of the suspension of FIG. 8, according to a simulation.

FIG. 10 is a graph that illustrates the stress on an actuator of the suspension of FIG. 8, according to an example. As illustrated herein, the dampening device 450 reduces the stress to the actuator during the contact point between the leading edge and the load beam. In this case, the actuator stress is lower than the actuator stress illustrated in FIG. 8.

Figure 11:
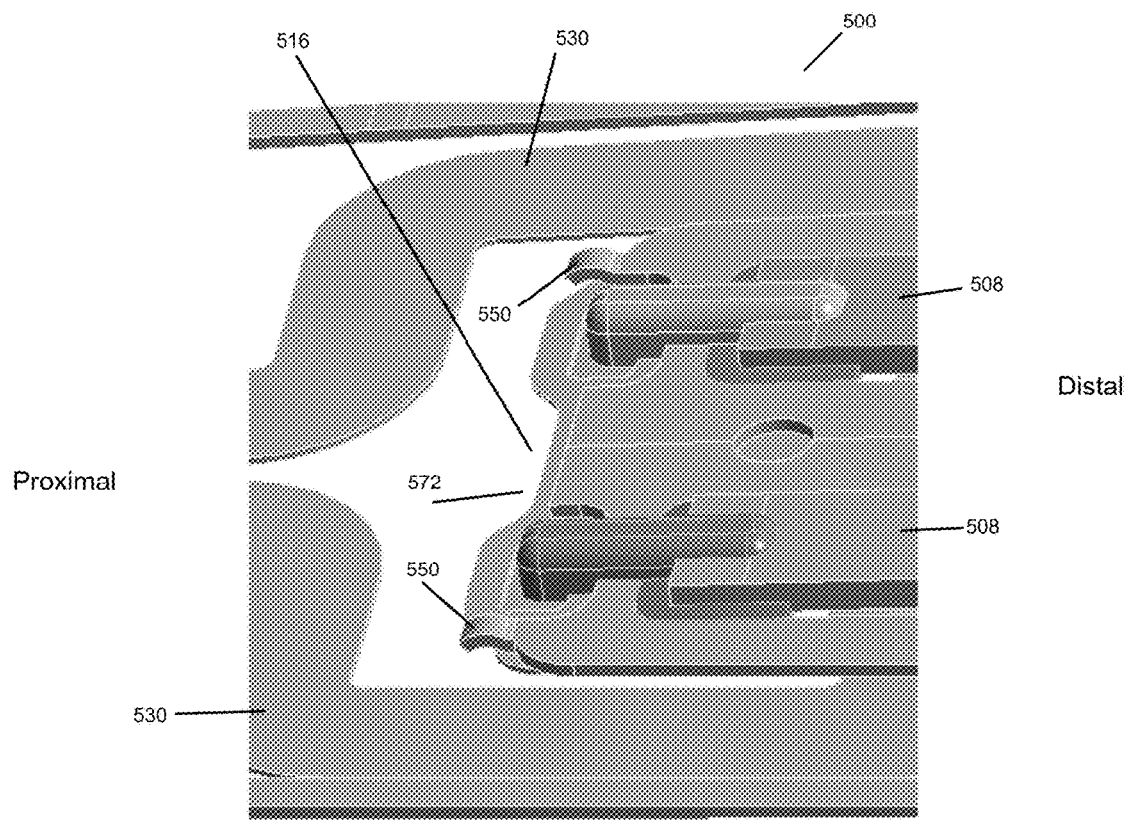
FIG. 11 is a top isometric view of a gimbal assembly of a flexure, in accordance with an example of the disclosure.

FIG. 11 is a top isometric view of a gimbal assembly 500, in accordance with an example of the disclosure. The gimbal assembly 500 includes a slider tongue 516. The slider tongue 516 has an elongated shape with a proximal end and a distal end. A magnetic read/write head slider can be attached to the slider tongue 516 at the distal end. A proximal end of the slider tongue 516 is referred to herein as the leading edge 572. The slider's leading edge 572 can contact an undersurface of the load beam, as described above. At least one actuator 508 can be affixed to the slider tongue 516, between the proximal end and the distal end. The actuator is configured to span respective gaps in the slider tongue 516, such as those described herein. The positive and negative electrical connections can be made from the actuators to the conductive traces 530. When the actuator 508 is activated, it expands or contracts and thus changes the length of the gap thereby producing fine movements of the read/write head that is mounted at the distal end of the slider tongue 516.

The conductive traces 530 can extend from a proximal end to the distal end of the gimbal assembly 500. The gimbal assembly 500 is configured to enable the slider tongue 516 to pitch and roll freely in response to surface irregularities in a data disk as the disk spins underneath the head slider. The leading edge 572 of the slider tongue 516 can include at least one dampening device 550. The leading edge 572 includes multiple dampening devices 550, one positioned at each corner of the leading edge 572. The dampening device 550 can be curved at an end that contacts the load beam. The dampening device may be made from the base metal material extending from the surface of the slider tongue 516. Alternatively, the dampening device 550 can include viscoelastic material, or any other known dampening materials, affixed or attached to the slider tongue 516. The curve-shape of the dampening device 550 is configured to further reduce the impulse during the non-op shock event (e.g., that shown at FIG. 6) and thus lower the stress on the actuator 408.

Figure 12:
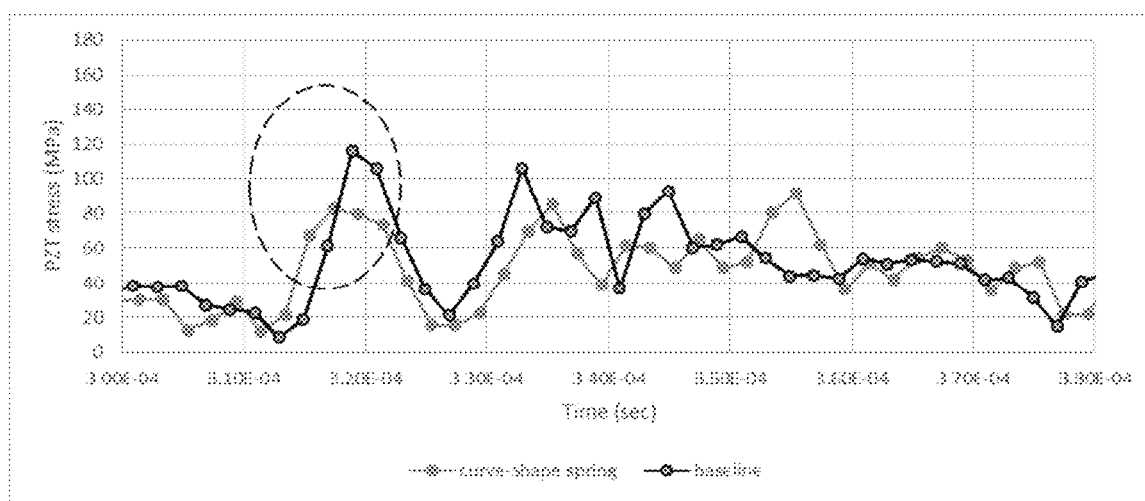
FIG. 12 is a graph that illustrates the stress on a PZT microactuator of the suspension of FIG. 10, according to a simulation.

FIG. 12 is a graph that illustrates the stress on an actuator of the suspension of FIG. 10, according to an example. As illustrated herein, the dampening device 550 reduces the stress to the actuator 508 during the contact point between the leading edge 572 and the load beam. In this case, the actuator stress is lower than the actuator stress illustrated in FIG. 8.

Figure 13:
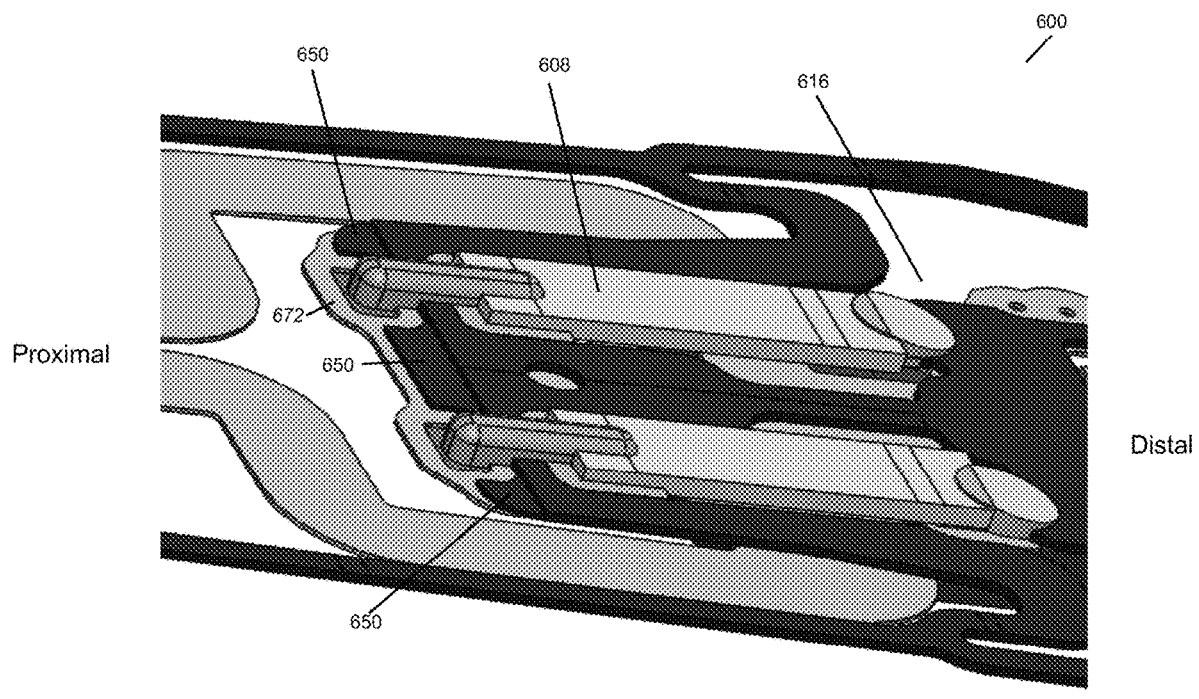
FIG. 13 is a top isometric view of a gimbal assembly of a flexure, in accordance with an example of the disclosure.

FIG. 13 is a top isometric view of a gimbal assembly 600, in accordance with an example of the disclosure. The gimbal assembly 600 includes a slider tongue 616. The slider tongue 616 has an elongated shape with a proximal end and a distal end. A magnetic read/write head slider can be attached to the slider tongue 616 at the distal end. A proximal end of the slider tongue 616 is referred to herein as the leading edge 672. The slider's leading edge 672 can contact an undersurface of the load beam, as described above. When the actuator 608 is activated, it expands or contracts and thus changes the length of the gap thereby producing fine movements of the read/write head that is mounted at the distal end of the slider tongue 616.

The gimbal assembly 600 is configured to enable the slider tongue 616 to pitch and roll freely in response to surface irregularities in a data disk as the disk spins underneath the head slider. The leading edge 672 of the slider tongue 616 can include at least one partial etched portion 650. The leading edge 672 includes multiple partial etched portions 650, one positioned at or near each corner of the leading edge 672. The thinner partial etched portions 650 will be weaker and can be a spring or have elasticity to further reduce the impulse during the non-op shock event (e.g., that shown at FIG. 6) and thus lower the stress on the actuator 608.

Figure 14:
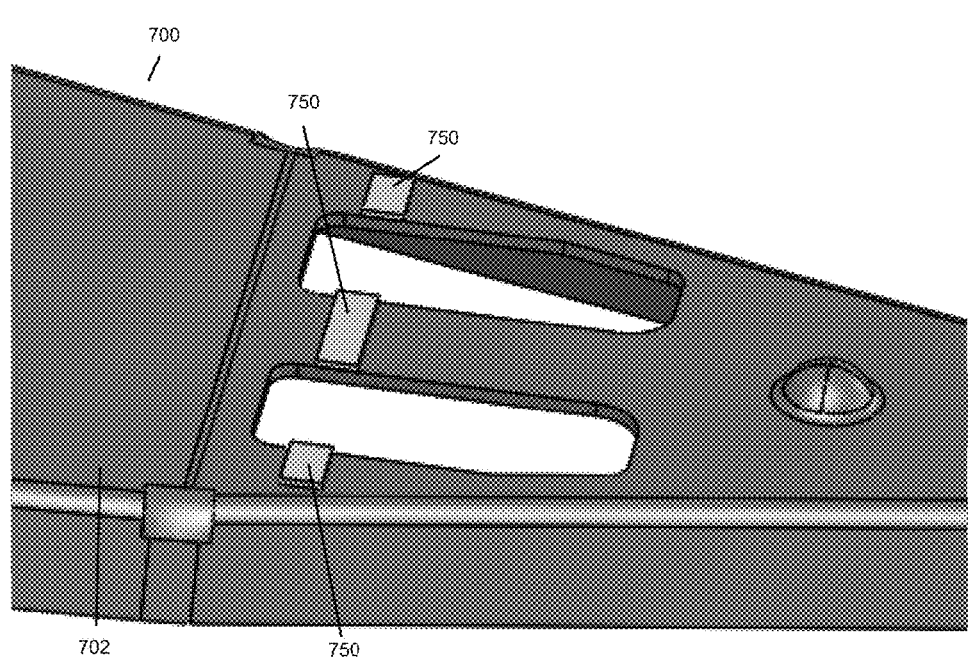
FIG. 14 is a bottom isometric view of a load beam, in accordance with an example of the disclosure.

FIG. 14 is a bottom isometric view of a load beam 700, in accordance with an example of the disclosure. The load beam 700 has a mounting surface 702 for a flexure that includes a gimbal assembly. The mounting surface 702 can include more than one damping material 750. The damping material 750 is located at a location where the slider tongue contacts the mounting surface 702 of the load beam. The damping material 750 is configured to soften the impact of the leading edge of the slider tongue. The damping material 750 can be made up of viscoelastic material, or any other dampening material. The damping material 750 is configured to enable a damping effect and absorb the impact energy during the non-op shock event (shown at FIG. 6). The damping material 750 is able to lower the stress on the actuator 608.

Figure 15:
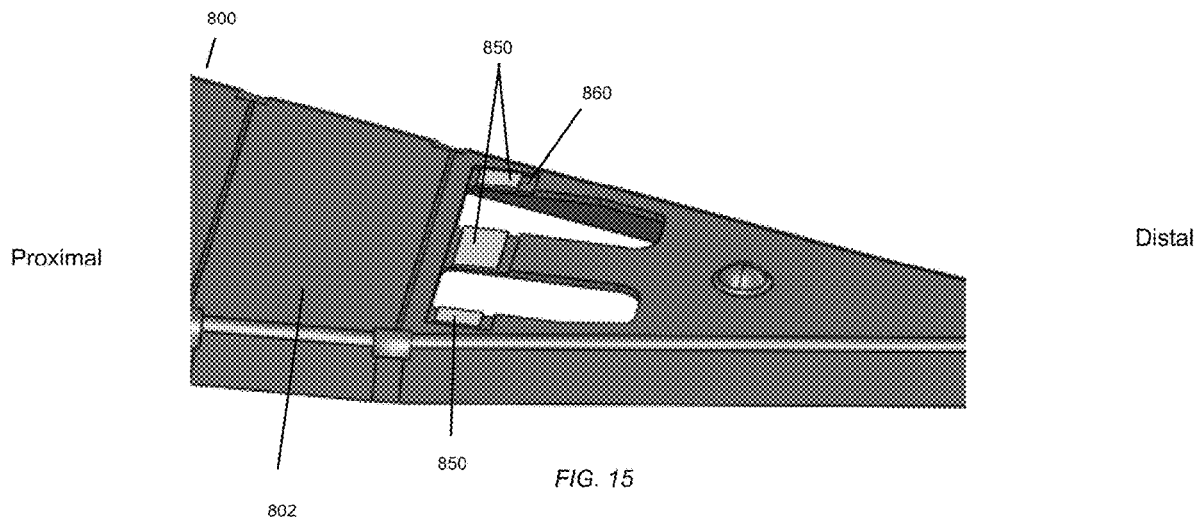
FIG. 15 is a top isometric of a load beam, in accordance with an example of the disclosure.

FIG. 15 is a bottom view of a load beam 800, in accordance with an example of the disclosure. The load beam 800 has a mounting surface 802 for the gimbal assembly. The mounting surface 802 can include more than one damping material 850 positioned at a partially etched area 860. The damping material 850 and the partially etched area 860 is located at a location of where the slider tongue contacts the mounting surface 802 of the load beam 800. The damping material 850 is configured to soften the impact of the leading edge of the slider tongue and the thinner partial etched portions 860 will be weaker and can be a spring or have elasticity to further reduce the impulse during the non-op shock event. The damping material 850 can be made up of viscoelastic material, or any other dampening material. The damping material 850 is configured to enable a damping effect and absorb the impact energy during the non-op shock event (shown at FIG. 6). The damping material 850 lowers the stress on the PZT microactuator 808.

Figure 16:
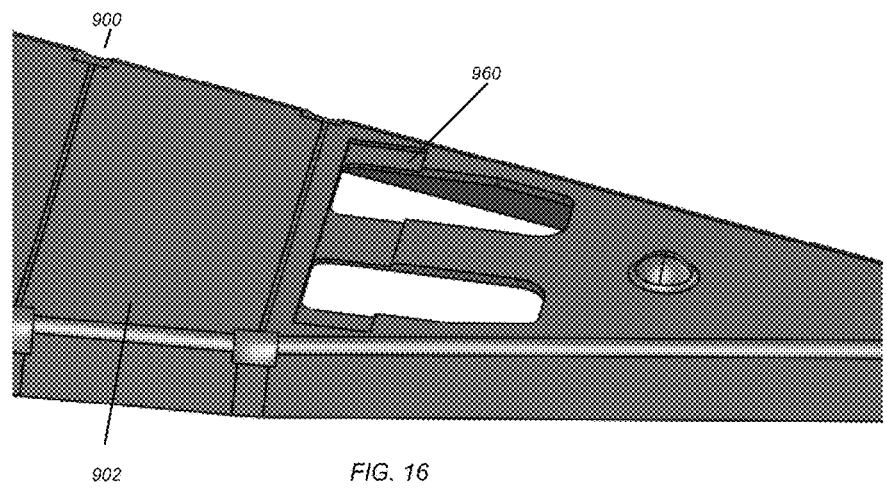
FIG. 16 is a top isometric of a load beam, in accordance with an example of the disclosure.

FIG. 16 is a bottom view of a load beam 900, in accordance with an example of the disclosure. The load beam 900 has a mounting surface 902 for the gimbal assembly. The mounting surface 902 includes a partially etched area 960 to form a recess forming a below the bottom surface of the load beam 900. For some embodiments, the etched area 960 is configured to receive one or more damping device, such as those described herein, on a slider tongue within the etched area 960. The etched area 960 is a damping device configured to reduce impact with a slider tongue of a flexure, such as those described herein. Forming a damping device on a load beam reduces the size, thickness, and/or area needed on a slider tongue. Thus, some embodiments enable using a damping device instead of or in addition to damping material on a slider tongue.

Figure 17:
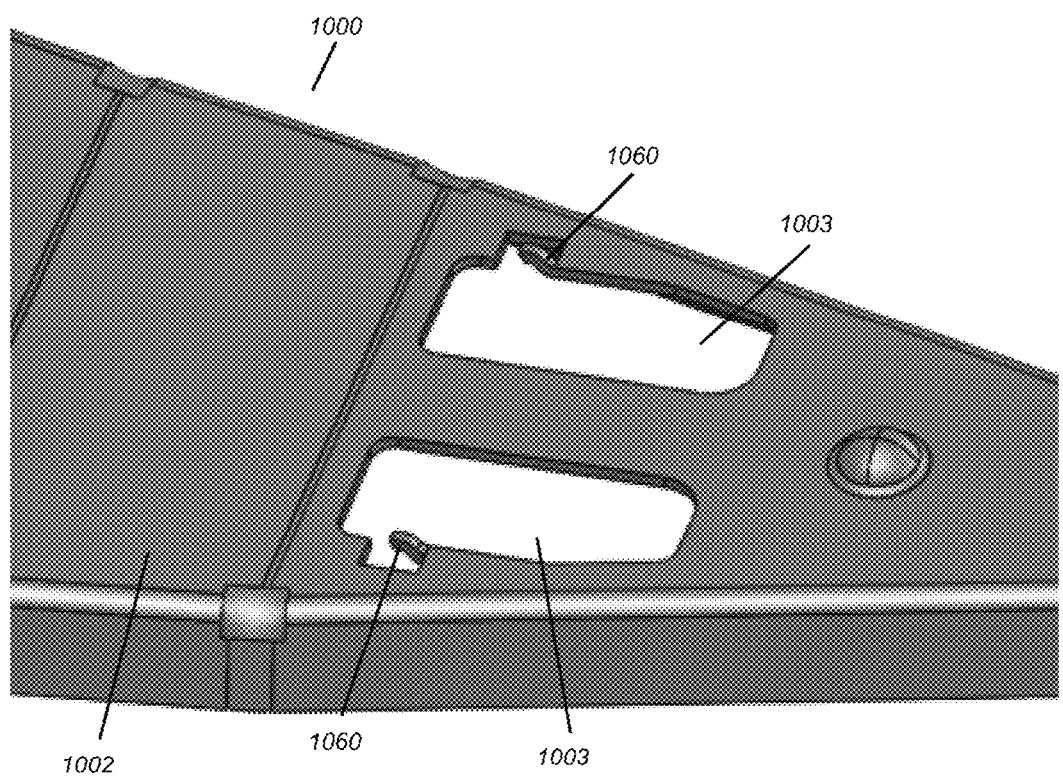
FIG. 17 is a top isometric of a load beam, in accordance with an example of the disclosure.

FIG. 17 is a bottom view of a load beam 1000, in accordance with an example of the disclosure. The load beam 1000 has a mounting surface 1002 for the gimbal assembly. The mounting surface 1002 is configured to one or more dampening device 1060 formed from a base metal material extending from a surface of the load beam 1000. For some embodiments, the metal material extending from a surface of a load beam are formed as one or more tabs. The one or more dampening device, such as one or more tabs, are configured to extend beyond the bottom surface of the load beam 1000. The damping device 1060 is configured to soften the impact of the leading edge of the slider tongue against the load beam 1000 to reduce the impulse during the non-op shock event. The damping device 1060 alone or with damping material on a slider tongue is configured to enable a damping effect and absorb the impact energy during the non-op shock event (shown at FIG. 6). The damping device, such as those described herein, lowers the stress on the PZT microactuator. Thus, some embodiments enable using a damping device instead of or in addition to damping material on a slider tongue.

It will be understood that the terms "generally," "approximately," "about," "substantially," and "coplanar" as used within the specification and the claims herein allow for a certain amount of variation from any exact dimensions, measurements, and arrangements, and that those terms should be understood within the context of the description and operation of the present disclosure.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "example" as used herein should not be construed to mean that only a single example having a single essential element or group of elements is presented. Similarly, it will also be appreciated that the term "present disclosure" encompasses a number of separate innovations which can each be considered separate examples. Although the present disclosure has thus been described in detail with regard to the preferred examples and drawings thereof, it should be apparent to those skilled in the art that various adaptations and modifications of the present disclosure may be accomplished without departing from the spirit and the scope of the present disclosure. Accordingly, it is to be understood that the detailed description and the accompanying drawings as set forth hereinabove are not intended to limit the breadth of the present disclosure, which should be inferred only from the following claims and their appropriately construed legal equivalents.

We claim:

1. A flexure comprising:
a slider tongue with a proximal end and a distal end, the slider tongue including a leading edge at the proximal end; and
a set of dampening devices extending outwards from the leading edge of the slider tongue along a same plane as the slider tongue, the set of dampening devices including at least one dampening device at each corner of the leading edge and at least two dampening devices positioned between the dampening devices at each corner of the leading edge, the each of the set of dampening devices are configured with an end formed to soften an impact of each dampening device against the load beam to reduce an impulse during a non-operational shock event.

2. The flexure of claim 1, wherein any of the set of dampening devices are made from a base metal material extending from a surface of the slider tongue.

3. The flexure of claim 1, wherein any of the set of dampening devices include a viscoelastic material attached to the slider tongue.

4. The flexure of claim 1, wherein the at least one dampening device is curved at an end in a direction of the proximal end.

5. A suspension comprising:
a flexure including:
  a slider tongue with a proximal end and a distal end, the slider tongue including a leading edge at the proximal end,
  a magnetic read/write head slider attached to the slider tongue at the distal end,
  at least one actuator affixed to the slider tongue, between the proximal end and the distal end, and
a set of dampening devices extending outwardly from the leading edge of the slider tongue along a same plane as the slider tongue, the set of dampening devices including at least one dampening device at each corner of the leading edge and at least two dampening devices positioned between the dampening devices at each corner of the leading edge, each of the set of dampening devices are configured with an end formed to soften an impact of the at least one dampening device against the load beam to reduce an impulse during a non-operational shock event; and
the load beam including:
  a mounting surface configured to receive the flexure, and
  one or more damping material positioned at a location of where the slider tongue contacts the mounting surface of the load beam during the non-operational shock event.

6. The suspension of claim 5, wherein any of the set of dampening devices are made from a base metal material extending from a surface of the slider tongue.

7. The suspension of claim 5, wherein any of the set of dampening devices include a viscoelastic material attached to the slider tongue.

8. The suspension of claim 5, wherein the at least one dampening device is curved at an end that contacts the load beam.

9. The suspension of claim 5, wherein the one or more damping material is made up of viscoelastic material.

10. The suspension of claim 5, comprising one or more partially etched area, each of the one or more partially etched area is located at the one or more damping material.

* * * * *